US012679274B2

(12) United States Patent (10) Patent No.: US 12,679,274 B2
Slama (45) Date of Patent: Jul. 14, 2026

(54) OPTICAL ASSEMBLY, CAMERA SYSTEM, CAMERA MONITOR SYSTEM, VEHICLE, AND METHOD USING THE SAME

(71) Applicant: Motherson Innovations Company Limited, London (GB)

(72) Inventor: Alexander Slama, Stuttgart (DE)

(73) Assignee: Motherson Innovations Company Limited, London (GB)

( * ) Notice: Subject to any disclaimer, the term of this patent is extended or adjusted under 35 U.S.C. 154(b) by 0 days.

(21) Appl. No.: 19/086,280

(22) Filed: Mar. 21, 2025

(65) Prior Publication Data

US 2025/0340170 A1 Nov. 6, 2025

(30) Foreign Application Priority Data

May 2, 2024 (DE) ...................... 10 2024 112 387.7

(51) Int. Cl.
  B60S 1/02 (2006.01)
  B60R 1/26 (2022.01)
  (Continued)
(52) U.S. Cl.
  CPC ................ B60R 1/26 (2022.01); B60S 1/023 (2013.01); G02B 7/025 (2013.01); G02B 7/14 (2013.01);
  (Continued)
(58) Field of Classification Search
  CPC ....................................................... B60S 1/023
  See application file for complete search history.

(56) References Cited

U.S. PATENT DOCUMENTS 10,373,992 B1 8/2019 Hsu et al.
2009/0284599 A1 11/2009 Wagner et al.
(Continued)

FOREIGN PATENT DOCUMENTS

CN 107343128 A 11/2017
CN 214929449 U 11/2021
(Continued)

OTHER PUBLICATIONS

German Patent Office, Appl. 10 2024 112 387.7, Office Action, Sep. 18, 2024.
(Continued)

*Primary Examiner* — Young Lee
(74) *Attorney, Agent, or Firm* — Jones Day

(57) ABSTRACT

The present disclosure relates to an optical assembly for camera system for a vehicle, in particular a truck, comprising at least one first lens adapted to project at least one first field of view, at least one second lens adapted to project at least one second field of view, at least one lens holder, at least one first lens tube adapted to support the first lens, and at least one second lens tube adapted to support the second lens, wherein (i) the first and/or the second lens is/are connected at least partly to the first lens tube, the second lens tube and/or the lens holder, and/or (ii) the first lens tube and/or the second lens tube is/are at least partly connected to the lens holder by at least one UV adhesive. Furthermore, the present disclosure refers to a camera system as well as camera monitor system with said camera system as well as a vehicle with said camera system. Still further, a method for aligning such an optical assembly as well as a method for analyzing and processing image data of at least one camera system are provided.

20 Claims, 6 Drawing Sheets

(51) Int. Cl.

| | |
|---|---|
| *G02B 7/02* | (2021.01) |
| *G02B 7/14* | (2021.01) |
| *G02B 27/62* | (2006.01) |
| *G03B 17/12* | (2021.01) |
| *H04N 23/58* | (2023.01) |
| *H04N 23/698* | (2023.01) |
| *H04N 23/90* | (2023.01) |
| *H04N 25/44* | (2023.01) |
| *G06V 20/56* | (2022.01) |

(52) U.S. Cl.
CPC ............. *G02B 27/62* (2013.01); *G03B 17/12* (2013.01); *H04N 23/58* (2023.01); *H04N 23/698* (2023.01); *H04N 23/90* (2023.01); *H04N 25/44* (2023.01); *B60R 2300/10* (2013.01); *B60R 2300/30* (2013.01); *G06V 20/56* (2022.01)

(56) References Cited

U.S. PATENT DOCUMENTS

| | | | |
|---|---|---|---|
| 2010/0103308 | A1 | 4/2010 | Butterfield et al. |
| 2013/0274923 | A1 | 10/2013 | By |
| 2014/0022657 | A1 | 1/2014 | Lu et al. |
| 2014/0300738 | A1 | 10/2014 | Mueller |
| 2016/0356978 | A1 | 12/2016 | Osborne |
| 2019/0150717 | A1 | 5/2019 | Lu et al. |
| 2020/0171998 | A1 | 6/2020 | Kondo et al. |
| 2022/0244531 | A1 | 8/2022 | Lintz et al. |
| 2025/0196771 | A1* | 6/2025 | Yoshikawa ............... B60R 1/22 |
| 2025/0196877 | A1* | 6/2025 | Iijima ....................... B60R 1/22 |
| 2025/0222868 | A1* | 7/2025 | Heydari ................... B60R 1/22 |

FOREIGN PATENT DOCUMENTS

| | | |
|---|---|---|
| DE | 10 2010 063 403 | 6/2012 |
| DE | 10 2021 200 954 | 8/2022 |
| JP | 2003-169233 | 6/2003 |

OTHER PUBLICATIONS

UK Intellectual Property Office, Appl. GB2505716.7, Examination Report, Oct. 16, 2025.
UK Intellectual Property Office, Appl. GB2505716.7, Examination Report, Apr. 21, 2026.

* cited by examiner

OPTICAL ASSEMBLY, CAMERA SYSTEM, CAMERA MONITOR SYSTEM, VEHICLE, AND METHOD USING THE SAME

CROSS-REFERENCE TO RELATED APPLICATION

This application claims priority from German Patent Application No. DE 10 2024 112 387.7, filed on May 2, 2024, the entirety of which is incorporated herein by reference.

FIELD

The present disclosure relates to an optical assembly for a camera system for a vehicle. Furthermore, the present disclosure refers to a camera system as well as camera monitor system with said camera system as well as a vehicle with said camera system. Still further, a method for aligning such an optical assembly as well as a method for analyzing and processing image data of at least one camera system are provided.

BACKGROUND

When driving a vehicle, it is particularly relevant to be able to perceive the vehicle's surroundings. For example, rear view devices can provide a rear view of the sides of a vehicle. However, some fields of view remain unobserved, such as blind spots. Furthermore, there are fields of views, e.g. in the direct vicinity of the vehicle at the front, rear or side, which cannot be detected by the driver or by rear view devices.

Furthermore, distant areas on rear view devices can only be perceived by the driver in a very small and sometimes indistinct way. In particular, the behavior of other road users in the immediate vicinity or far away from the vehicle can lead to dangerous situations. Recognizing these situations can be impaired by the driver's cognitive abilities and/or experience or by a lack of concentration. Generally, there is a need to pay attention to other vehicles positioned at the front, rear, sides, and the like, of a vehicle or obstacles for careful driving of the vehicle.

Therefore, various camera systems are used for vehicles in order to support drivers e.g. by supplementing rear view mirrors or to deliver certain field of views. Due to the requirements for safe and predictive driving, both near and far areas around a vehicle must be covered.

A system for monitoring the surrounding environment of a vehicle by photographing the surrounding environment of the vehicle using cameras each attached to the front, rear, left, and right of the vehicle and a system for detecting a blind spot have been proposed.

WO 2023/006832 A1 relates to a camera monitor system for a motor vehicle, in particular in the form of a truck, preferably with a trailer, comprising: a camera adapted to be attached to a motor vehicle and having at least one field of view (FOV), and a controller, wherein the camera comprises a lens with a lens center axis and an imager, and wherein the imager has an imaging center aligned with the lens center axis and an array of pixels which is divided into a first imager area and a second imager area, wherein the first imager area has a first imager area center which is offset from the lens center axis. The first imager area is an active imager area defined by an array subset of activated pixels, the second imager area is an inactive imager area defined by an array subset of deactivated pixels, and the controller only receives image data from the activated pixels in the active imager area and not from the deactivated pixels in the inactive imager area.

U.S. Pat. No. 10,666,908 B2 discloses a camera module including a plurality of lenses which is mounted in different directions to form each image, one image sensor unit which is mounted to be movable to corresponding positions of each image formed by the plurality of lenses, a guide part which selectively moves the image sensor unit, and an image processor which processes an image signal output from the image sensor unit.

EP 1 263 213 A1 relates to camera system with a first imaging lens and a second imaging lens whose image picking-up directions are different, a reflecting member for changing an optical path of an image picked up via one imaging lens such that image forming direction of the first imaging lens and the second imaging lens are set in a same direction, an imaging device having imaging surfaces on which images picked up via the first imaging lens and the second imaging lens are formed, a signal processing member for signal-processing an image signal that is converted into an electric signal by the imaging device, a display portion for displaying the image signal which is subjected to the signal processing by the signal processing member, and a selecting member for selecting the image signal corresponding to any one of the first imaging lens and the second imaging lens to display it on the display portion.

Known camera systems need a plurality of cameras having one lens and one imager. The plurality of cameras and its imagers lead to a high bandwidth for reading out the video streams of the respective imagers so that the target areas in the camera field of view can be output and/or processed and/or digitally analyzed in a high resolution and frame rate.

In case different areas of view of have to be provided to an occupant of the vehicle, for example the view of a digital Intelligent Rear View Mirror (IRVM) according to class I as well as a backing-up view according R158, the hardware has to be provided twice. For example inter alias two separate cameras and thus two camera holders, two video cables, two heater cables, two video cable connectors and/or two video deserializers on an ECU have to be used. Furthermore, during installation about two times the effort for installation of one camera system is necessary. This significantly increases the costs. In addition, it is necessary to provide a sensor resolution able to provide the areas of view, class I (and wide panning) and R158, in sufficient resolution.

Still further, each camera need its SERDES IC and cable to transfer the image data from the camera to the control unit. However, since a viewing angle of a camera module which is used in the system for monitoring the surrounding environment of a vehicle and a viewing angle of a camera module which is used in the system for detecting a blind spot are different from each other, there is a need to use a camera module capable of securing different viewing angles for each driving assistance system and or camera monitor system.

Also, the problem exists that it is not possible to provide high resolution displays of a class IV area on a display.

SUMMARY

In view of the aforementioned drawbacks and other inherent in the existing state of the art, it is the object of the present disclosure to further develop the known camera system for vehicles to overcome at least some of these drawbacks. In particular it is an object to provide a camera system fulfilling several functions so as to reduce the number of camera systems mounted on a vehicle. Further, it is an object to optimize the data stream efficiency and the limiting bandwidth of the mounted camera systems for reading out the video streams and thus save transfer and processing capacity and at the same time providing a high resolution and frame rate. It is another object to reduce the material, components and costs of the needed camera systems of a vehicle for mounting and assembly of said system.

This object is accomplished according to the present disclosure by an optical assembly for a camera system for a vehicle, in particular a truck, comprising at least one first lens adapted to project at least one first field of view, at least one second lens adapted to project at least one second field of view, at least one lens holder, at least one first lens tube adapted to support the first lens, and at least one second lens tube adapted to support the second lens, wherein (i) the first and/or the second lens is/are connected at least partly to the first lens tube, the second lens tube and/or the lens holder, and/or (ii) the first lens tube and/or the second lens tube is/are at least partly connected to the lens holder. Preferred optical assemblies of the present disclosure are described in claims 2 to 5.

In one embodiment the connections of the first and/or the second lens to the first lens tube, the second lens tube and/or the lens holder, and/or of the first lens tube and/or the second lens tube to the lens holder comprises at least partly at least one UV adhesive, the first lens may comprise at least one seat section, the second lens may comprise at least one seat section, wherein preferably the seat section may be at least partly connected to the first lens tube, the second lens tube and/or the lens holder by the UV adhesive, and/or the first tube may comprise at least one seat section and/or the second tube may comprise at least one seat section, wherein preferably the seat section may be at least partly connected to the lens holder by the UV adhesive, and/or the use of UV adhesive may enable, in particular in an uncured state of the adhesive, a relative alignment between the first lens and/or the second lens, and/or the first lens tube and/or the second lens tube.

According to various aspects the first and/or second field of view, in particular the first field of view, may be a close range field of view, preferably covering at least one area that may comprise at least a part of the vehicle, that may be at least partly adjacent to the optical assembly and/or the vehicle and/or that may be distanced from the optical assembly and/or the vehicle by a maximum of 0.2, 0.5, 1, 2, 3, 5 or 10 meters.

According to another aspect the first and/or second field of view, in particular the first field of view (20), at least may comprise at least partly at least one area of a view area group comprising ECE R159 MOIS, ECE R151 BSIS, ECE R158, ECE R46, blind spot area according to ISO 17387, mirror class area I, mirror class area II, mirror class area IV, and/or mirror class area V and/or SVS area around the optical assembly, in particular the first field of view is different from the second field of view and/or the first field of view comprises one of the areas of the view area group, whereas the second field of view comprises a different area of the view area group.

It may be further advantageous that the first and/or second field of view, in particular the second field of view, may be a far range field of view, preferably covering at least one area starting with a distance from the optical assembly (2) and/or the vehicle of at least three meters, five meters, and/or seven meters.

In another embodiment, the first and/or second field of view, in particular the second field of view, may cover at least one area, that is distanced from the optical assembly and/or the vehicle by a maximum of 10, 20, 30, 50, 70, 100 or 300 meters.

In another aspect, the first and second field of view may overlap at least partly or may not overlap.

In various embodiment the optical axis of the first and/or second lens, in particular the first lens, may be substantially horizontal, in particular horizontal and/or parallel relative to a supporting ground of the vehicle, to a main plane of the optical assembly and/or the camera system, optionally an optical axis of an imager of the camera system, and/or the optical axis of the first and/or second lens, in particular the second lens, may be tilted towards a horizontal plane of the optical assembly, in particular being parallel to the supporting ground of the vehicle, a main plane of the optical assembly and/or the camera system, optionally an optical axis of an imager of the camera system, preferably by 30° to 60°, more preferably by 52°, and/or may be tilted in particular towards an area of the close range field of view, especially the first lens and the second lens are tilted towards the horizontal plane of the optical assembly with respective different angles, optionally to provide a least one backing-up view and/or comprising a first field of view covering a mirror class I area and/or a second filed of view covering an R158 area.

In one embodiment, the first and/or second lens may be heatable, in particular by at least one heat provider, wherein optionally the heat provider may comprise at least one first heat element for the first lens and at least one second heat element for the second lens, and wherein preferably at least one, optionally each, heat element may be formed at least partly in a ring shape and/or may surround at least partly the first and/or second lens.

In a further embodiment the first lens may have a first aperture angle, preferably of 63.54°×44°, and/or the second lens may have a second aperture angle, optionally wider than the first aperture angle, preferably of 168°×148°, or the second lens may have a first aperture angle, preferably of 63.54°×44°, and/or the first lens may have a second aperture angle, optionally wider than the first aperture angle, preferably of 168°×148°.

The present disclosure, moreover, provides a camera system comprising an optical assembly as outlined above and at least one imager.

In one embodiment the UV adhesive may enable, in particular in an uncured state of the adhesive, a relative alignment between the first and/or second lens, and/or first and/or second lens tube relative to the imager, in particular before attaching the first and second lens and/or first and second lens tubes by curing the UV adhesive, the first lens and/or the second lens may be adapted to project its/their field of view onto the common imager, and/or the imager may provide at least one first area receiving at least partly the first field of view and at least one second area receiving at least partly the second field of view, wherein preferably the first and the second area may overlap or may not overlap.

It may be preferred that the lens plane of the first and/or second lens, in particular the first lens, may be substantially perpendicular to an optical axis of the imager, and/or the first and/or second field of view, in particular the second field of view, is projected onto the imager by at least one light guide element and/or light deflection element, preferably at least one mirror, more preferably at least one deflection mirror.

According to various embodiments, the optical assembly may be adapted to adjust the first and/or second field of view, in particular by moving the first lens and/or moving the second lens, wherein preferably the movement of the first and/or second lens may be provided by at least one hinge section, preferably comprised by and or connected to the lens holder, the first lens, the second lens, the first lens tube, and/or the second lens tube; and/or a movement, in particular a rotation, of the lens holder, in particular together with the imager and/or relative to a mounting position on the vehicle, and/or the first and/or second lens tube, in particular relative to each other and/or relative to the lens holder and/or relative to the mounting position on the vehicle, and/or the first and/or second lens, in particular relative to the imager, wherein in particular a movement of the first and/or second lens, especially relative to the first lens tube, the second lens tube and/or the lens holder, and/or a movement of a third and/or fourth lens may enable a zooming in or zooming out effect and/or change of the depth of field.

It may be further preferred that the camera system may comprise at least two optical assemblies, wherein preferably the at least two optical assemblies may interact, preferably by aligning the optical assemblies, and/or at least a part of the image data of the at least one imager of the at least two optical assemblies may be read out at least partly together, and/or the image data of the at least two optical assemblies may be read out, transferred, displayed analyzed and/or processed at least partly together, and/or may form at least one rear view device, in particular a rear view mirror and/or a rear view camera.

The present disclosure is also directed to a camera monitor system comprising at least one camera system as outlined above and at least one monitor and/or at least one electronic control unit.

The present disclosure is further directed to a vehicle, in particular a truck, comprising at least one camera monitor system as outlined above, at least one camera system as outlined above, and/or at least one optical assembly as outlined above, wherein at least two camera systems may be mounted on opposite sides of the vehicle, and/or the camera system may be adapted to capture at least partly ECE R159 MOIS, ECE R151 BSIS, ECE R158, ECE R46, blind spot area according to ISO 17387, mirror class area II, mirror class area IV, and/or mirror class area V and/or SVS area around the camera.

The present disclosure still further provides a method of aligning the optical assembly as outlined above, and/or the camera system as outlined above, comprising the steps of: providing the at least one first lens and the at least one second lens, providing the at least one first lens tube and the at least one second lens tube, providing the at least one lens holder, providing the at least one UV adhesive, optionally providing the at least one imager, applying the UV adhesive to a surface, in particular the seat section, of the first lens, the first lens tube, the second lens, the second lens tube, and/or the lens holder, in particular an interface to another element, and aligning the first and second lens, the first and second lens tube and/or lens holder relative to each other, optionally relative to the imager.

In an embodiment, the method of aligning may further comprise the step of acquiring data provided by the imager, wherein the step of aligning comprises analyzing the data, in particular controlling and/or altering the data by the aligning.

According to another embodiment, the method of aligning may further comprise the step of curing the UV adhesive, optionally using light in the UV range, in particular after finalizing the step of aligning.

Also, in one embodiment, the present disclosure is directed to a method of analyzing and processing image data of at least one camera system as outlined above comprising the steps of: defining, in particular dynamically, at least one target viewing field of the camera system, wherein preferably the target viewing field comprises at least partly the first and/or second field of view, and analyzing, altering and/or processing the data provided by the camera system based on the target viewing field.

It is further proposed, that the step of defining at least one target viewing field may comprise adjusting and/or setting the target viewing field in particular depending on sensor data, mounting position of the camera system, in particular during mounting of the camera system to the vehicle, driver input data and/or software feedback.

In an embodiment, the step of adjusting may comprise a movement of at least one element of the camera system, in particular the optical assembly, optionally the first lens, the first lens tube, the second lens, the second lens tube, the lens holder, and/or the imager, and/or adapting an readout area of the imager.

In yet another embodiment the processing of the data may comprise defining, in particular dynamically, at least one first readout area of the first area of the imager, defining, in particular dynamically, at least one second readout area of the second area of the imager, processing the image data readout from the imager, reading out image data of the first and/or second readout area, transferring the image data of the first and/or second readout area to at least one electronic control unit, processing the image data of the first and/or second readout area preferably in the electronic control unit, and/or displaying at least partly the processed image data of the first and/or second readout area on at least one monitor, wherein preferably the step of defining the first and/or second read out area may be depending on sensor data, mounting position of the optical assembly and/or camera system, driver input data, software feedback an area of view of interest, in particular an area of view of class IV, a required frame rate, in particular 50 fps or 30 fps, wherein preferably the step of processing may comprise mirror back the received image data of the read out mirrored image data of the first and/or second readout area, wherein preferably the step of processing comprises in a first configuration using a first second field of view and second second field of view read out with a first frame rate from a first area of the sensor and comprises in a second configuration using a first second field of view and second second field of view read out with a second frame rate, optionally being below the first frame rate, and stitching to the second second field of view read out a read out of a further area of the sensor, optionally a wide field of view area, wherein preferably the step of displaying comprises to display a field of view, in particular the wide filed of view, with a first video effect, wherein optionally the first video effect comprises bit blurry display, and/or wherein optionally the at least partly displayed image data of the first and second readout areas may be displayed individually or combined, wherein preferably the combined display may form a substantially panoramic view of and/or around the vehicle.

It is also proposed by the present disclosure that the method may be adapted for use for predictive and/or resource saving driving, and/or the adjustment of the target viewing field may lead to a substantially front view, side view, rear view, panoramic view, and/or combined view, preferably depending on the main driving direction of the vehicle, sensor data, state of the gearshift, a state of the gearbox, driver input, and/or a combination thereof, wherein optionally the first lens and/or the second lens may project a close range in front or side of the vehicle, and/or the second lens and/or the first lens may project a far range in front and/or side and/or around the vehicle, wherein preferably the method further may comprise the steps of analyzing by means of software and/or at least one processor, preferably comprising artificial intelligence and/or machine learning, the image data of the second readout area, in particular of the far range, for at least one assistance system for predictive and/or resource saving driving, wherein preferably the assistance system may comprise in particular lane/sign recognition, brake assistant, autonomous driving and/or collision warning, and/or analyzing, optionally by means of software and/or at least one processor, preferably comprising artificial intelligence and/or machine learning, the image data of the first readout area of the close range for one or more assistance systems for outputting warning indications, such as visual indications of the area in front, side and/or back of the vehicle and/or approach assistant, wherein in particular the step of processing for the second readout area may be at least partly implemented by artificial intelligence and/or machine learning to enable and/or improve predictive driving, in particular by detecting at least one object, vulnerable road user, and/or pattern especially of hazardous situations and/or behavior pattern of at least one road user, the behavior pattern preferably being a braking behavior, wherein in particular the step of processing for the first readout area, in particular of the close range, may be at least partly implemented by artificial intelligence and/or machine learning to enable and/or improve predictive driving, in particular by detecting at least one object, vulnerable road user, and/or road user and preferably sending a warning and/or information to the driver especially by displaying the detected object, vulnerable road user, and/or road user as highlighted and/or by an optical and/or acoustical signal, detecting and/or locating at least one part of the vehicle and/or at least one appendage of the vehicle, in particular a trailer and/or the end of the trailer, and preferably sending a warning and/or information to the driver in particular by an optical and/or acoustical signal, a start-up assistant, that in particular may send a warning to the driver and/or may influence the driving behavior of the vehicle when detecting at least one vulnerably road user and/or a stop and/or go situation, wherein optionally the processed and/or analyzed data of the first and/or second readout area may be outputted at least partly as at least one CAN signal, and/or wherein optionally the processed and/or analyzed data of the first and/or second readout area may be used for the step of defining, adjusting and/or setting the target viewing field, in particular by means of artificial intelligence.

Combining two lenses with different field of view in one optical assembly of a camera system of a vehicle has many advantages in terms of effectiveness and efficiency. For example, a close range and a far range camera are combined in one camera system. Thus, certain elements of that camera system shared between the several combined lenses. That is in particular one common imager, which can be projected with the several field of views of the lenses commonly. Thus, the image data of all projecting lenses combined in one camera can be read out commonly and transferred together. For the previous two cameras with two imagers and two data transferring cables only one camera system with two lenses and two field of views but only one imager and one data transferring cable is needed. The joint read out of the image data optimizes the limiting bandwidth for reading out, transferring, processing, and analyzing the video stream. Fast, with less processing capacity the target areas of the camera field of views can be output in high resolution and frame rate. This increases the data stream efficiency, and effectiveness.

Generally a close range field of view is optionally understood by the skilled person as a field of view in close proximity to the vehicle, optionally including parts of the vehicle, whereas a far range field of view is optionally understood by the skilled person in the art as a field of view being focused on the surrounding of the vehicle, optionally covering also areas at increased distance to the vehicle. The terms close and far range field of view are used based on this general understanding of the skilled person.

The subject matter of the present disclosure further leads to a compact design by reducing building elements, such as sharing a common lens holder by combining two cameras into one camera system but still upholding different field of views and thus providing different functionalities depending on the different field of views. It also leads to reduced costs and time for assembling the camera system as well as mounting said camera system to a vehicle.

The UV adhesive enables the camera system to be assembled cost-effectively and, in particular, accurately. The components of the camera system, in particular the lens tubes, can be aligned to the suitable position on the lens holder as long as the UV adhesive is in an uncured state. Once the alignment is accomplished the adhesive can be activated and/or cured by UV light attaching the elements of the optical assembly to each other and securing them in a wanted position with respect to each other, in particular the first and second lens tubes with respect to the common lens holder. In particular active, time-targeted activation of the adhesive is possible. The alignment process of the elements may be parallel or sequential, i.e. as soon as one or both lens tubes are correctly positioned on the respective seat of the lens holder, the adhesive can be activated and/or cured with UV light that finalizes the attachment between the lens holder and the respective lens tube(s).

Further, the UV adhesive allows that the lens holder may provide two seats adapted to support the first and second lens tubes. This configuration allows to design the claimed camera system in a modular manner. The lens holder can be combined with different tubes, in particular tubes of different lengths and forms and the other way around a tube can be combined with different lens holders. In this way the number of elements to be on stock can be reduced as only a limited number of basic elements have to be kept available in contrast to a plurality of different complete components in which the different permutations of possible lens holders and lens tubes are combined.

Within this document, the term alignment refers to a step during manufacturing of the optical assembly. Whereas the term of adjustment or adjusting refers to a movement made during the use of the optical assembly and/or camera with said optical assembly.

The term "dynamically" refers to a change of a condition and/or state, wherein the change is related to a time factor such as the driving behavior of the driver.

Overlapping of the field of views of the several lenses of the one camera system as well as overlapping of the first and second areas of the imager provide many opportunities of processing and analyzing the image data. For example, the several field of views may be merged and/or aligned to display the driver a surround view and or a combined image.

Heating elements increase the safety features of the camera system. The provided heat removes water and/or ice from the lenses. The ring shape of the heat elements provide an even distribution of heat.

Changing the field of view of one or more lenses provides the possibility to adapt the field of view and the processing and analyzing of the image data to the driver and or vehicle behavior as well as to traffic, environment, and/or driving situations.

Artificial intelligence and/or machine learning may improve the step of changing the field of view as well as analyzing and processing the image data. In particular, pattern recognition may be used depending for example on driving behavior or movement pattern of objects/road users or detecting certain objects or detecting certain situation, in order to enable the predictive driving as well as safe driving. The use of artificial intelligence and/or machine learning is independent of the concentration or cognitive abilities of the driver. The data stream effectiveness and efficiency of the camera system of the present disclosure and enables the artificial intelligence and/or machine learning to react faster and thus improves safety of driving the vehicle.

It should be understood that any one of the described features and/or embodiments of the disclosure may be used separately or in combination with other disclosed features and/or embodiments. The term "at least one" refers to one or a plurality and may be even understood as "all of".

BRIEF DESCRIPTION OF THE DRAWINGS

Other aspects, advantages, and salient features of the present disclosure will become apparent to those skilled in the art from the following detailed description disclosing one or more embodiments of the present disclosure by way of example only, which taken in conjunction with the annexed drawings, discloses exemplary embodiments of the disclosure, wherein:

FIG. 6a shows the projected first and second filed of view captured by a camera system of the application of FIG. 5;

FIGS. 6b to 6e show different display combinations of two filed of views;

Figure 1:
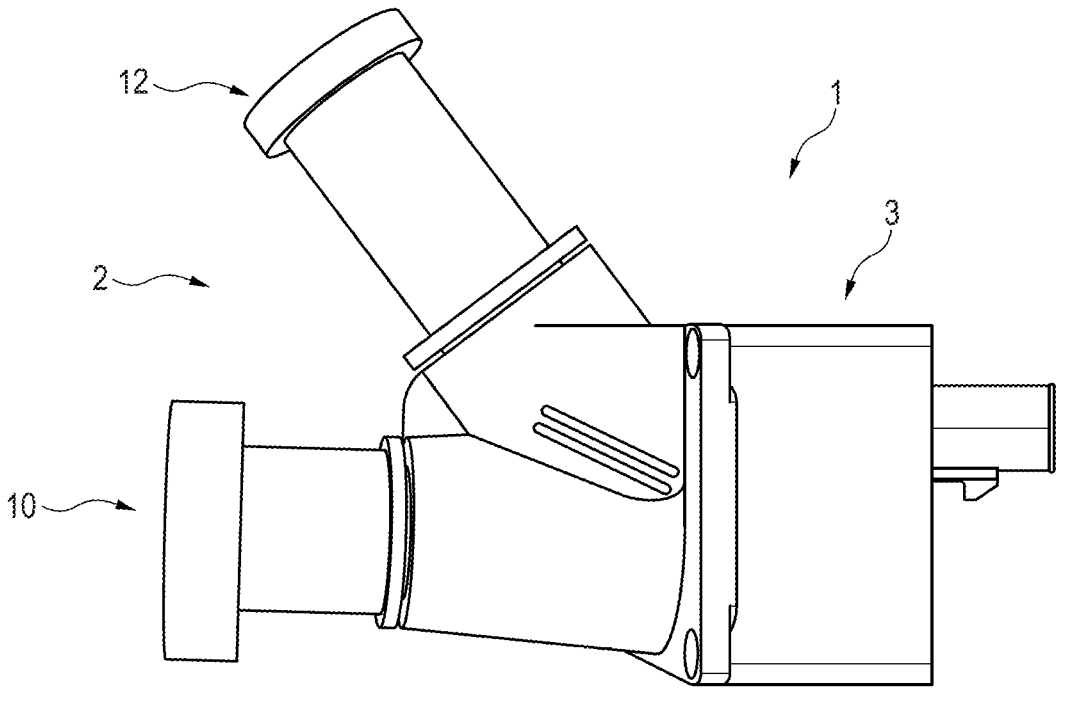
FIG. 1 shows a schematic illustration of an embodiment of an optical assembly of a camera system according to the present disclosure.

The drawings referred to in this description are not to be understood as being drawn to scale except if specifically noted, and such drawings are only exemplary in nature.

DETAILED DESCRIPTION

The foregoing objects, features and advantages of the present disclosure will become more apparent from the following detailed description related to the accompanying drawings. However, various modifications may be applied to the present disclosure, and the present disclosure may have various embodiments of the present disclosure. Hereinafter, specific embodiments of the present disclosure, which are illustrated in the drawings, will be described in detail.

In the drawings, the thicknesses of layers and regions may be exaggerated for clarity. When it is indicated that an element or layer is "on" or "above" another element or layer, this comprises a case in which another layer or element is interposed therebetween as well as a case in which the element or layer is directly above the other element or layer. In principle, reference signs designate elements throughout the specification. In the following description, like reference signs are used to designate elements, which have the same function within the same idea illustrated in the drawings of each embodiment of the present disclosure.

When detailed description of known functions or configurations related to the present disclosure is deemed to unnecessarily blur the gist of the disclosure, the detailed description thereof will be omitted. Also, numerals (e.g., first, second, etc.) used in the description herein are merely identifiers for distinguishing one element from another element.

In addition, the terms "module" and "unit" used to refer to elements in the following description are given or used in combination only in consideration of ease of writing the specification, and the terms themselves do not have distinct meanings or roles.

Furthermore, the use of a singular term, such as, "a" is not to be interpreted as limiting the number of components or details of particular components. Additionally, various terms and/or phrases describing or indicating a position or directional reference such as, but not limited to, "top", "bottom", "front", "rear", "forward", "rearward", "end", "outer", "inner", "left", "right", "vertical", "horizontal", etc. may relate to one or more particular components as seen generally from a user's vantage point during use or operation, and such terms and/or phrases are not to be interpreted as limiting, but merely as a representative basis for describing the disclosure to one skilled in the art. In addition, a suffix "region", "part", "unit" for a component used in the following description are given or mixed in consideration of only the ease of writing the specification, and do not have meanings or roles distinguished from each other.

The present disclosure relates to an optical assembly for a camera system as well as a camera system for a vehicle, in particular a truck with an appendage, for example a trailer. In general, the word vehicle in this disclosure refers to a vehicle as well as a vehicle with an appendage and/or trailer. Further, the term object, in particular regarding "detecting an object", refers to every material and/or tangible thing, such as at least one tree, stone, wall, street, street course, sidewalk, traffic light and the like, non material objects such as color or colored information (e.g. pedestrian crossing, warning color), light (e.g. related to traffic lights or sun or brake lamp of a vehicle) and the like, but also to any road user such as vulnerable road users (e.g. cyclists, pedestrians, animals), any type of a vehicle, driver or passengers of those vehicles such as motorcyclist and the like.

FIG. 1 is an embodiment of an optical assembly 2 of a camera system 1 according to the present disclosure, in which two lenses 10, 12 are integrated that are adapted to project their field of view on one common imager 3 according to an embodiment of the present disclosure.

Figure 2:
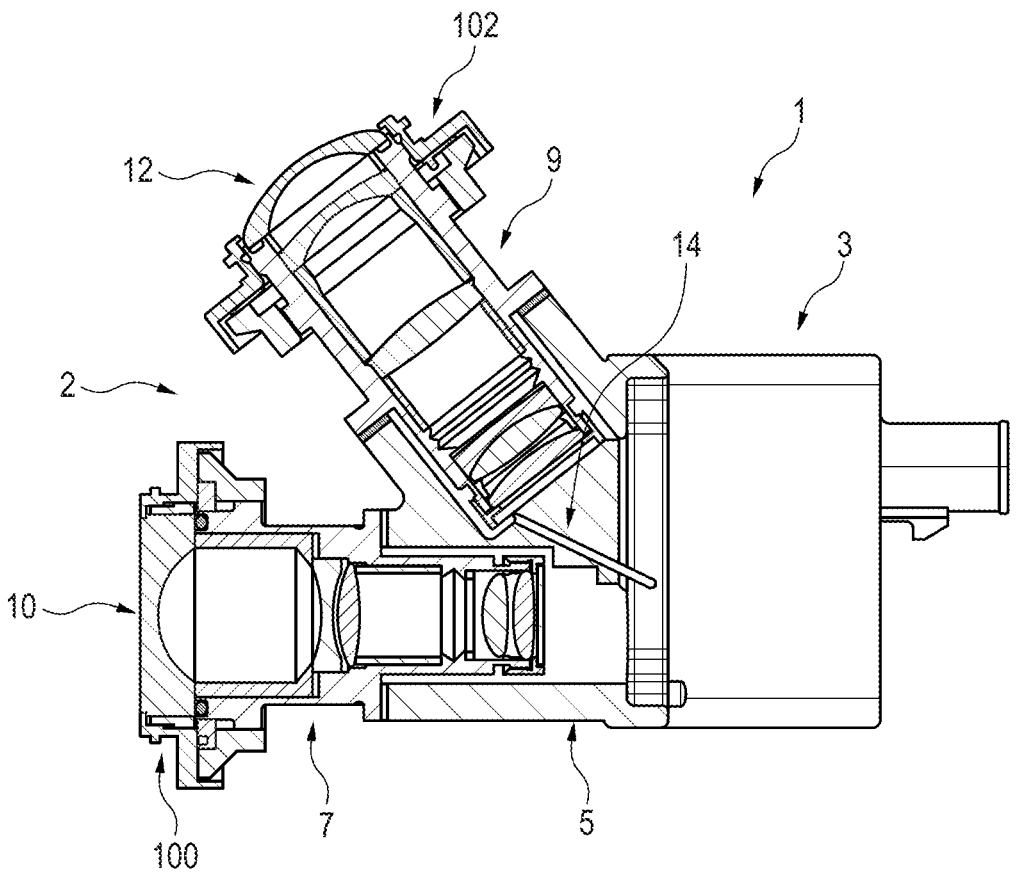
FIG. 2 shows a schematic illustration of a sectional view of the optical assembly of the camera system shown in FIG. 1.

FIG. 2 illustrates a cross-sectional view of the embodiment of the optical assembly 2 of the camera system 1 according to FIG. 1. The following description will be made with reference to FIGS. 1 and 2.

The camera system 1 according to the shown embodiments of FIGS. 1 and 2 comprises the optical assembly 2—with one lens holder 5—and one imager 3, which are fastened together. The lens holder 5 provides two seats adapted to support a first lens tube 7 and a second lens tube 9. The first and second lens tubes 7, 9 are attached to the lens holder 5 by an UV adhesive. The UV adhesive is applied to the lens holder 5 and/or lens tubes 7, 9 during the assembling of the optical assembly 2. The UV adhesive allows for active imager alignment as long as the adhesive in an uncured state, meaning that the elements of the optical assembly 2 and camera system 1 can be positioned exactly relative to each other before fixed. This fixation is reached by an active, time-targeted activation and/or curing of the adhesive with the help of light in the UV spectrum. This alignment may include the relative alignment between the lenses 10, 12 and/or a mirror 14 as well as the alignment of these elements relative to the imager 3. The alignment of the lenses 10, 12 may be parallel or sequential. Thus, as soon as one or both lens tubes 7, 9 are correctly positioned on the respective seat of the lens holder 5, the adhesive can be activated and/or cured with UV light and hardens/finalizes the attachment between the lens holder 5 and the lens tubes 7, 9.

A first end of the first and second lens tubes 7, 9 is attached to the lens holder 5, wherein an opposite, second end of the first and second lens tubes 7, 9 is adapted to support the first and second lens 10, 12 respectively.

According to the embodiment of FIGS. 1 and 2 the first lens 10 is adapted to capture a first field of view 20 for a close range and the second lens 12 is adapted to capture a second field of view 22 for a far range. The far range of the second field of view 22 is adapted to capture a part of the surrounding of the vehicle with a higher distance, than compared to the close range of the first field of view 20, which is adapted to capture at least a part of the near vicinity of the vehicle. With various embodiments, the first and second field of view 20, 22 may at least partly comprise ECE R159 MOIS, ECE R151 BSIS, ECE R158, ECE R46, blind spot area according to ISO 17387, mirror class area II, mirror class area IV, and/or mirror class area V and/or SVS area around the camera. The ECE standards refer to the corresponding UN Direct Vision Regulation. According to various embodiments, the first field of view 20 and the second field of view 22 overlap at least partly or do not overlap.

The first field of view 20 is projected by the first lens 12 to a first area 24 of the imager 3, whereas the second field of view 22 is projected to a second area 26 of the imager 3. The optical axis of the first lens 10 is substantially horizontal and perpendicular to the imager 3. The optical axis of the second lens 12 is tilted. According to various embodiments the optical axis of the second lens 12 may be tilted towards the ground or towards a side or the back of the vehicle or its trailer. The first field of view 10 is projected onto the first area 24 of the imager 3 directly, whereas the second field of view 22 is projected onto the second area 26 of the imager 3 by means of a deflection mirror 14. The ratio of the size of the first area 24 and the second area 26 depends on the image resolution needed of the first and second field of view 20, 22. The higher the needed resolution, the bigger the needed area size on the imager 3 for the respective field of view. According to various embodiments, the area sizes of the first and second area 24, 26 may be changed by an adaptable deflection mirror 14.

According to the embodiment of FIGS. 1 and 2 both the first and second lenses 10, 12 are provided with a heat provider comprising a first and second heating element 100, 102 respectively. The heating elements 100, 102 are provided in a ring shape and surround the first and second lenses 10, 12 in order to evenly provide heat to the first and second lens 10, 12. The provision of heat may be in particular helpful to remove ice, snow or water from the lenses 10, 12.

According to various embodiments, the heat elements 100, 102 may at least partly provide the attachment between the lens tube 7, 9 and the lens 10, 12. Additionally, the attachment of the lens 10, 12 onto the lens tube 7, 9 is preferably sealed.

According to the embodiment of optical assembly 2 of FIGS. 1 and 2, the lenses 10, 12 as well as lens tubes 7, 9 are stationary relative to the lens holder 5. In other embodiments at least one lens 10, 12 and/or lens tube 7, 9 may be movable also after activation of the US adhesive relative to each other and/or to the lens holder 5, for example using a hinge. In yet another embodiment the lens holder 5 may be movable relative to the imager 3 in order to change at least one field of view 20, 22 and/or to change at least one area 24, 26 of the imager 3.

The optical assembly 2 of a camera system 1 mounted to a vehicle may change the field of view 20, 22 by rotating around an axis and/or change the position onto the vehicle.

The optical assembly 2 of FIGS. 1 and 2 may be part of a camera system 1 comprising several optical assemblies 2 and/or imagers 3. In such a camera system 1 with more than one optical assembly 2 and/or imager 3, two or more optical assemblies 2 and/or imagers 3 may interact. In another embodiment, the image data of two or more imagers 2 of such a camera system 1 are read out, transferred, displayed, analyzed and/or processed at least partly together. The optical assembly 2 and/or the imager 3 of FIGS. 1 and 2 and/or said camera system 1 may further be part of a camera monitor system, wherein at least a part of the recoded image data of at least one imager 3 is displayed on at least one monitor.

The optical assembly 2 and/or camera system 1 according to the embodiment of FIGS. 1 and 2 are adapted to be mounted onto a vehicle. In particular, it may be a vehicle in form of a truck and more particular a truck having attached at least one trailer.

Figure 3:
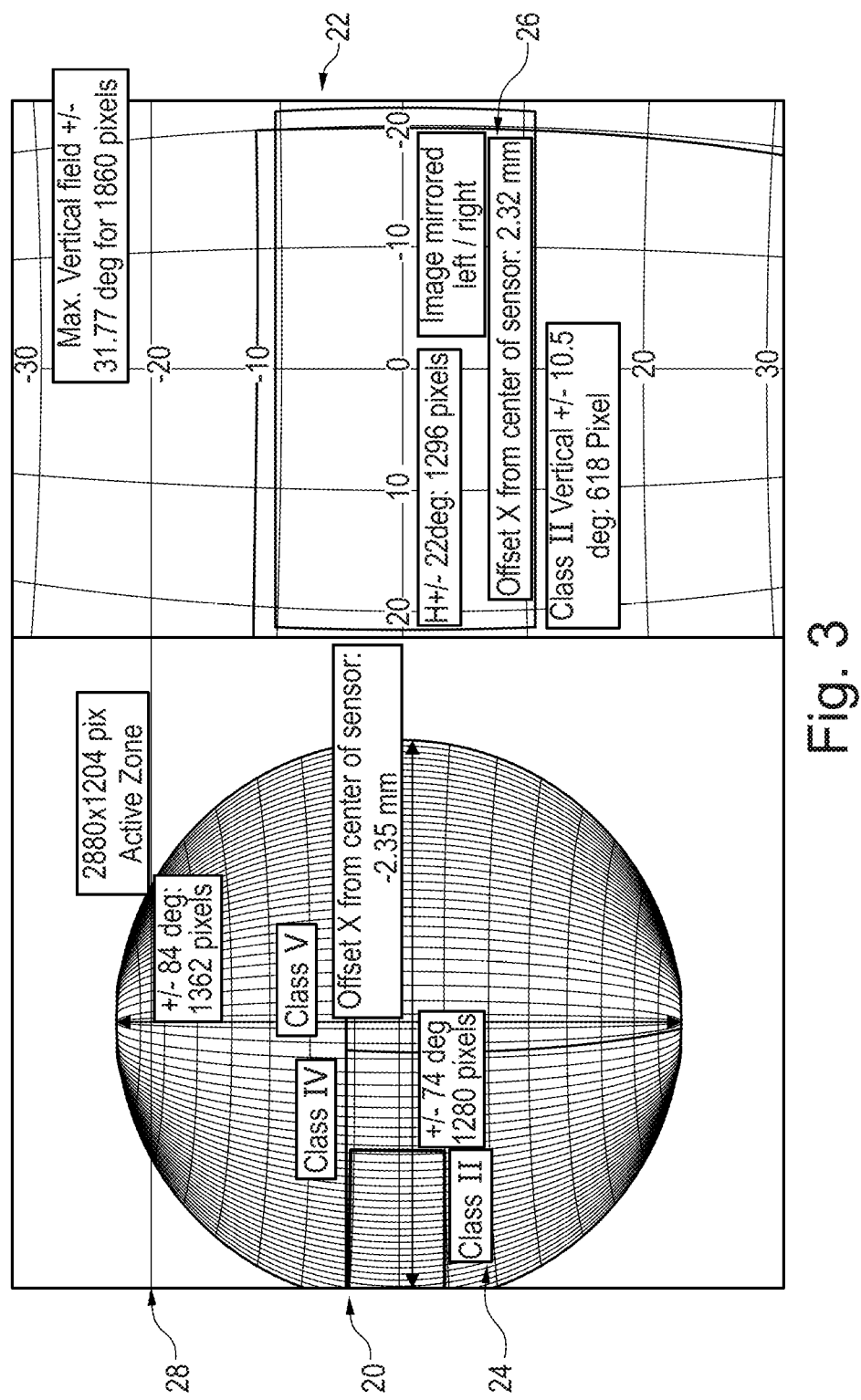
FIG. 3 shows the projected first and second field of view captured by a camera system according to the present disclosure.

FIG. 3 shows schematically one embodiment of a recording of the first and second field of view 20, 22 of an optical assembly 2 according to the present disclosure. On the left side of FIG. 3 the first field of view 20 is shown with a wide aperture angle of approximately 168°×148°. On the right side of FIG. 3 the second field of view 22 is shown with a narrow aperture angle of approximately 63.54°×44°. The possible usable digital image data of the first and second field of view 20, 22 is limited by the active imager zone 28. The active imager zone 28 defines the areas of the recorded first and second field of view 20, 22, which are sensed by the imager 3 as an image sensor and thus correspond to the first and second area 24, 26 of the imager 3. According to various embodiments the active zone 28 is defined by the design of the imager 3, software and/or calibration. FIG. 3 shows exemplarily the different mirror class areas II, IV and V within the recorded field of views 20, 22.

Figure 4:
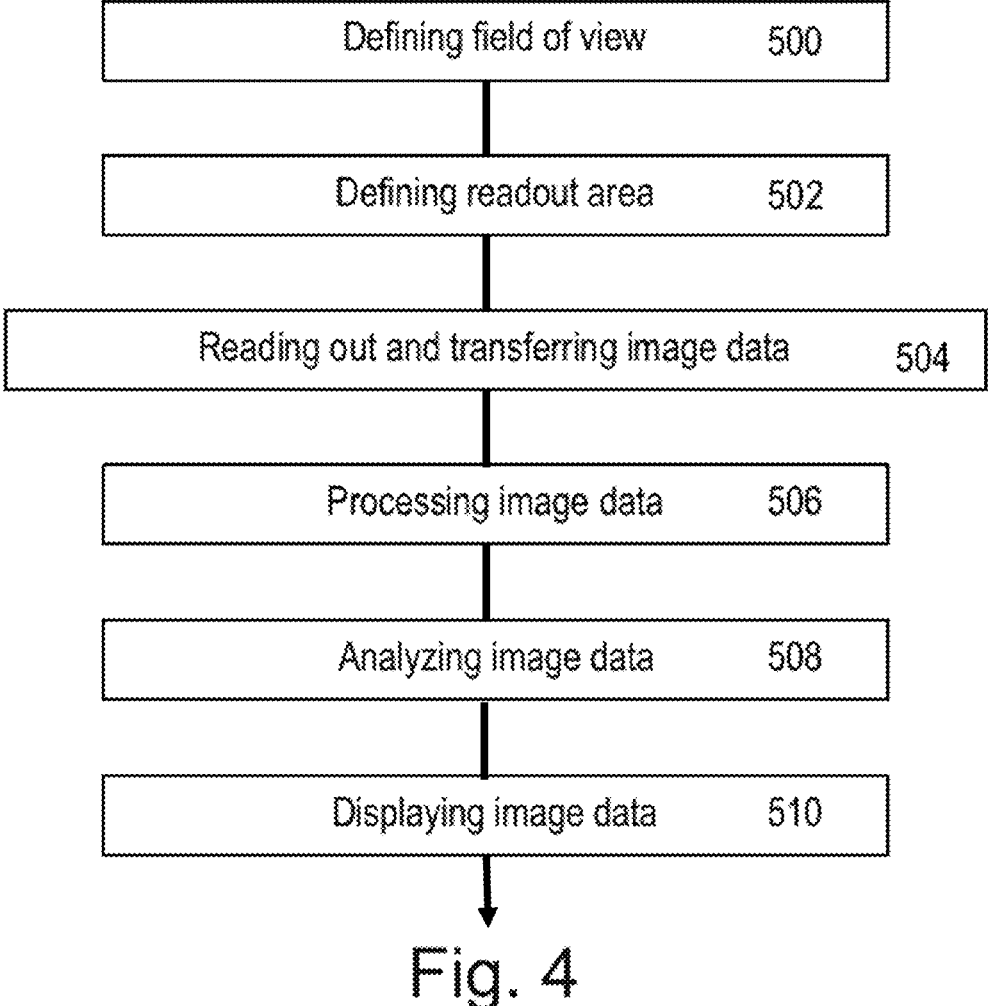
FIG. 4 shows a diagram of an embodiment of the method of analyzing and processing image data of at least one camera system according to the present disclosure.

According to FIG. 4 an embodiment of a method of analyzing and processing image data of at least one imager 3 and/or camera system 1 is provided. In a first step 500 the first and/or second field of view 20, 22 may be adjusted to a defined target viewing field in particular according to sensor data, mounting position, driver input and/or software feedback. Software feedback is to be understood as every signal outputted by a software and/or processor processing and/or analyzing data, e.g. of the vehicle, driver or in particular image data of a camera system 1. In this step, according to the safety needs of the driver as well as personal needs of the driver or depending on a driving situation the field of views 20, 22 are to be adjusted to suit the current driving situation. For example, the field of views depend on the main driving direction. Thus, the first step is to be conducted dynamically according to the changing driving situation and/or is calibrated after mounted the camera system 1 onto the vehicle.

In a second step 502 of the method, the first and second read out areas of first and second areas 24, 26 on the imager 3 are to be defined. According to various embodiments, the area size of the first and/or second read out area may be zero and/or nonzero. This step may be part of an calibration after mounting the camera system 1 onto the vehicle. In another embodiment, this step is conducted dynamically according to the driving situation in analogy to the first step 500. For example, depending on the installation side of the camera system 1, the first and/or second readout area ("active sensor area") is determined by a software so that the area covered by the camera system 1 that extends away from the vehicle is captured and not additional areas of the vehicle that are not of interest.

With the second step 502 it is secured, that only the needed part of the first and second area 24, 26 of the imager 3 are read out. With this optimizing the data stream and optimizing the processing time of image data as well as meeting the driver's or driving situation's needs is ensured.

In a third step 504 the image data of the first and second readout areas are read out and transferred to an electronic control unit. The control unit may be part of a camera monitor system or be part of the vehicle.

In a fourth step 506 the read out image data of the first and second read out area is processed. According to various embodiments the step of processing 506 is conducted at least partly in the electronic control unit. In further embodiments, a further processing unit is needed in order to process the read out image data. In case a field of view 20, 22 is projected onto the imager 3 via a mirror and or the field of view is mirrored by another optical or digital effect, the step of processing comprises mirror back the read out mirrored image data. Further, the step of processing comprises cropping, distorting and/or coloring at least a part of the read out image data. Further, the fourth step 506 may include removing and/or correct certain parts of the read out image data, such as removing recorded objects or image errors or unimportant image sections and/or correct exposure errors, color errors or reflections and/or changing the size of at least a part of the image to be displayed. Additionally, the fourth step 506 may include adding image data such as highlighting certain objects or areas of the image to be displayed or adding new image data in form of signals such as a warning symbol.

In a fifth step 508 the processed image data and/or (raw) read out image data is analyzed in order to generate further information for the driver and/or an assistance system of the vehicle. In particular, the generated information are used for predictive and resource saving driving. It may also be used for autonomous driving.

The step 508 of analyzing is conducted by means of software, in particular by means of artificial intelligence and/or machine learning based software. The software may be adapted to detect objects and/or patterns (e.g. of driving situation, environmental situation, driving behavior, behavior of other road users) and in particular recognize possible hazardous situation. According to various embodiments, the software is adapted to recognize the different field of views of the first and second read out area, in particular distinguish between the close range and the far range field of view. The assistance system fed with information of the analyzing step 508 may comprise lane/sign recognition, brake assistant, autonomous driving, approach assistant and/or collision warning. The fed assistance systems may change dependent on whether image data of the close range or far range field of view is analyzed.

In particular, the information of the analyzing step 508 may be send to the control unit and/or processing unit of step 506 in order to add and/or remove and/or change image data to be displayed. For examples warning indications in form of optical and/or acoustical signals may be outputted. An optical output may be in form of a highlighting of a recognized object of interest and or part of interest of the vehicle or by any other area of the image to be displayed. An optical output may also be in form of a letter, text, symbol and/or image, wherein the processed image is overlaid with those optical outputs.

In a further embodiment, the step 508 of analyzing comprises detecting and/or locating at least one part of the vehicle, in particular an appendage, like a trailer and/or the end of the trailer, in order to send a warning and/or information to the driver for example by an optical and/or acoustical signal. With this feature, the driver is enabled to track the location of the appendage and/or the trailer. Especially having a truck with at least one large trailer it is important for the driver to know the position of the trailer and predict the behavior of the trailer while driving. This is important in back up or parking situation in which the driver misjudges his driving behavior in relation to the movement of the trailer. For example, with this step 508, it may be avoided that the angle between the trailer and the truck is too narrow or that the driving behavior of the driver leads to a crash of the trailer with another object.

In yet another embodiment image data is used for a start-up assistant. The start-up assistant supports the driver in start-up situation by outputting warnings to the driver and/or influence and/or adapt the driving behavior of the vehicle. The start-up assistant may be used for stop and/or go situation, such as near crossings, traffic lights and/or traffic jam, in order to prevent obstructing traffic by remaining stationary for longer than necessary. The start-up assistant may also warn the driver and or influence the driving behavior of the vehicle, when vulnerable road users such as cyclists and/or pedestrians, such as playing kids, are detected.

In a sixth step 510 the processed image data of the first and/or second readout area is at least partly displayed on at least one monitor. The image data of the first and/or second read out area may be displayed at least partly together in a combined image or separated. In embodiments with an at least partly combined image of the first and second image data, at least a part of a panoramic view of the vehicle and/or trailer may be displayed.

According to various embodiments, the camera system 1 and/or the electronic control unit may output at least a part of the results of the steps 506, 508 of processing and/or analyzing of the first and/or the second read out area as a CAN signal. In another embodiment said results are output via a monitor of a camera monitor system and or via an acoustic signal output device such as a loudspeaker.

Figure 5:
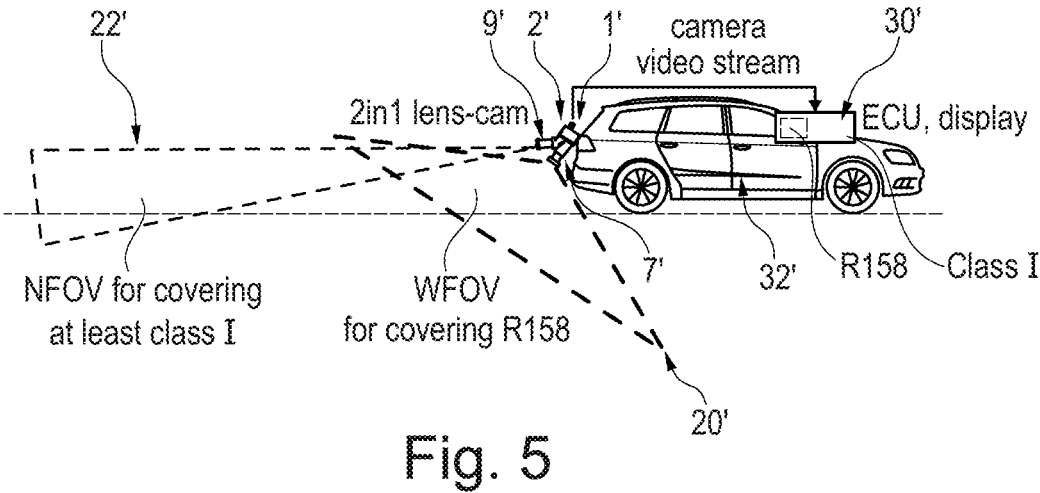
FIG. 5 shows a schematic diagram of an application of the optical assembly.
Figures 6A, 6C, 6D, 6E:
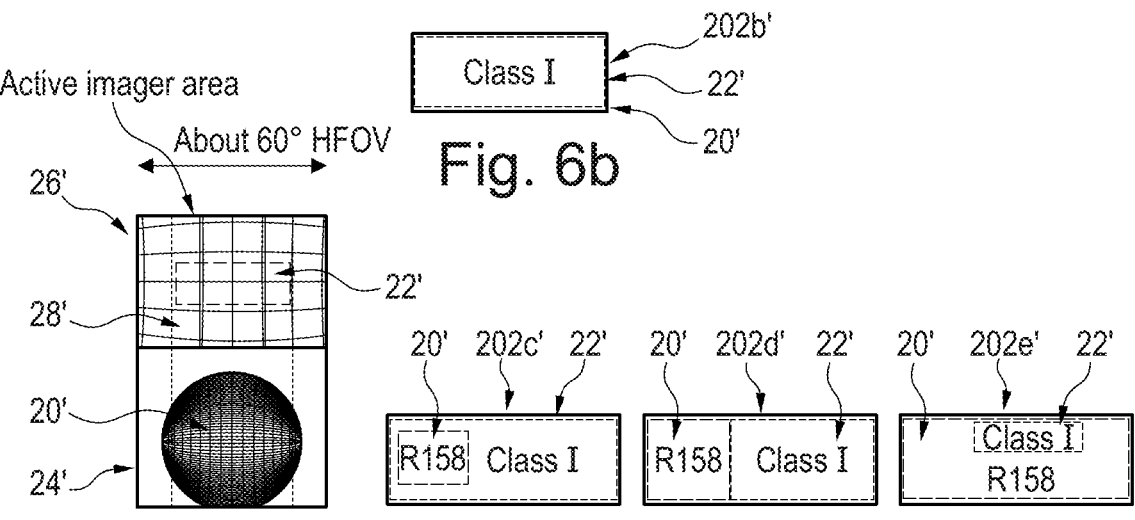

With the help of FIGS. 5 to 6e an application of the optical assembly 2' is described. The elements shown in FIGS. 5 to 6c corresponding to elements of camera system 1 and optical assembly 2, respectively, have the same references signs, however, with one apostrophe, The optical assembly 2' is comprised by camera system 1' and is used to provide simultaneously a digital intelligent rearview mirror (IRVM) showing the class I view area represented by the second field of view 22' and a backing-up view according R158 represented by the first filed of view 20' with one sensor. The claimed optical assembly 2' in particular allows to provide a camera system 1' having a single camera with single sensor with linear lenses able to provide the second (class I) field of view 22' and the first (R158) field of view 20' in sufficient resolution.

To reach this aim, the single camera l' having two lenses in lens tubes 7', 9' is connected to an interior rear view display, optionally via an ECU 30', that provides proper class I and R158 view areas 20', 22'. The configuration with two lenses allows to project the respective view areas 20', 22' on two separate sensor areas 24', 26' on a single sensor. There the views can be read out for the two fields of views 20', 22' to be shown. Thus it is possible to generate the two views with a single camera system only.

To provide the different filed of view areas 20', 22' the camera system 1' is installed on a vehicle 32' such that the first lens and the second lens have optical axis that span a plane that is perpendicular to a ground surface of the vehicle 32' and/or a horizontal plane. The optical axis of the lenses are tilted with different angles relative to a horizontal direction extending parallel to the ground surface.

The read out from the single sensor of the camera system is shown in FIG. 6A. Two areas 24', 26' of an active imager area of the sensor are read out. The first area 24' corresponds to a class I filed of view area 22' whereas the second area 26' corresponds to a R158 field of view area 20'.

Using different areas 24', 26' of the single sensor allows to apply a read out with a speed of 60 fps to provide a high frame rate with a simultaneously high resolution for display. In addition, at this frame rate, high resolution could be provided in vertical direction for class I (in total) 40° but limited in horizontal direction. This allows for an optimal sensor activation for both areas to be read out i.e. for class I and R158 views.

If more panning in horizontal direction would be needed, the active sensor area could be adjusted accordingly to the required read out of the intended e.g. 40° HFOV, an area of up to 64° HFoV could be provided.

If a panoramic view in high resolution, i.e. up to 64° HFoV would be needed to be shown on the display, frame rate could be reduced and by that active imager area could be increased and read out.

FIGS. 6b to 6e show different display options of the read out data.

In FIG. 6b a display option 202b' is shown in which only the Class I filed of view 22' is displayed. In particular additional degrees around the minimal required FoV according ECE R46 for class I could be provided.

In FIGS. 6c to 6e different options to simultaneously display the class I filed of view 22' and the backing up filed of view 20' according R158 are shown. Optionally additional degrees around class I and R158 could be provided.

In FIG. 6c the backing-up filed of view 20' is displayed as picture-in-picture of the class I field of view 22'.

In FIG. 6d the backing-up filed of view 20' is displayed as picture-beside-picture with the class I field of view 22'.

In FIG. 6e the backing-up field of view 20' is displayed as full picture still showing the class I filed of view 22' in form of a picture-in-picture.

Figure 7:
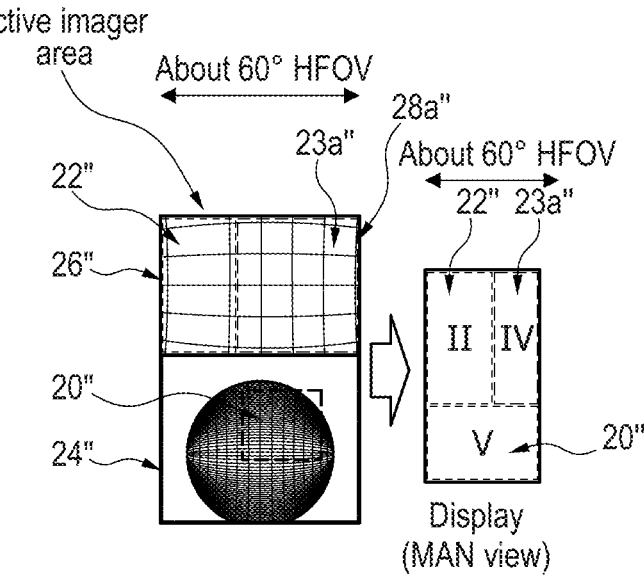
FIG. 7 shows the projected first and second field of view captured by a camera system according to the present disclosure according to a further embodiment allowing a display at a first frame rate.
Figure 8:
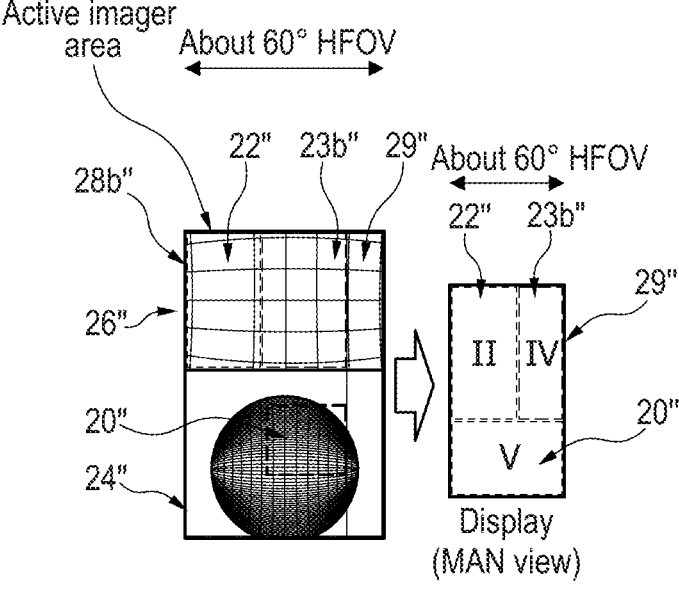
FIG. 8 shows the projected first and second field of view captured by a camera system according to the present disclosure according to the embodiment of FIG. 7 allowing a display at a second, compared to the first frame rate, increased frame rate.

To show a high resolution picture of the field of view, for example of a class IV area, it is proposed that the camera system using the claimed optical assembly, uses a technique described with the help of FIGS. 7 and 8.

FIG. 7 shows the projected first field of view 20" view and a second field of view formed by a first second field of view 22" and second second field of view 23a" captured by a camera system in line with the present disclosure according to a further embodiment. This embodiment allows a display at a first frame rate of 30 fps together with the respective display shown to a user. The elements shown in FIGS. 7 and 8 corresponding to the elements of the before described embodiments have the same reference signs, however, with two apostrophes.

The first field of view 22" represents a class V view. To generate the class II field of view the first second field of view 22" is defined in step 502 and read out in step 504. To generate the class IV field of view the predominant part of the sensor element in form of the second second field of view 23a" and active imager zone 28a" is defined in step 502 and read out in step 504. This leads to a read out of the class II field of view area 22" together with almost all horizontal extensions for the class IV field of view 23a" comprising the second second field of view 23a", in step 504, process the data in step 506 allowing a display in high resolution in step 510.

In FIG. 8 shows the projected (class V) first field of view 20" and a second field of view formed by a first second field of view 22" and a second second field of view 23b" captured by a camera system according to the present disclosure. The camera system is similar to the one used in FIG. 7, however, allows a display in step 510 at a second frame rate of 50 fps together with the respective display shown to a user. To generate the class II field of view the first second field of view 22" is defined in step 502 and read out in step 504. To generate the class IV field of view a reduced part of the sensor element compared to FIG. 7 in form of the second second field of view 23b" and active imager zone 28b" is defined in step 502 and read out in step 504. This leads to a read out of the class II field of view 22" together with a plurality of horizontal extensions for class IV field of view 23b" in step 504 allowing in step 510 a display in high resolution whereas compared to the configuration shown in FIG. 7 at least one further area 29" outside the active imager area 28b" of the sensor element is read out from the wide field of view area and in step 506 stitched together to generate the display shown in the right part of FIG. 8. In this way it becomes possible to display in step 510 the important parts of the class IV view with an increased frame rate and high resolution.

As described above, although the embodiments are described by the limited embodiments and the drawings, various modifications and changes may be made by those skilled in the art from the above description. For example, appropriate results may be achieved even if the described techniques are performed in a different order than the described method, and/or components of the described system, structure, apparatus, circuit, etc. are combined or combined in a different form than the described method, or replaced or substituted by other components or equivalents.

Therefore, other implementations, other embodiments of the present disclosure, and those equivalent to the claims also fall within the claims to be described below.

REFERENCE SIGNS 1, 1' camera system
2, 2' optical assembly
3 imager
5 lens holder
7, 7' first lens tube
9, 9' second lens tube
10 first lens
12 second lens
14 mirror
20, 20', 20" first field of view
22, 22' second field of view
22" first second field of view
23a", 23b" second second field of view
24, 24', 24" first area
26, 26', 26" second area
28, 28', 28a", 28b" active imager zone
29" area
30' ECU
32' vehicle
100 first heat element
102 second heat element
500 Defining field of view step
502 Defining readout area step
504 Reading out and transferring image data step
506 Processing image data step
508 Analyzing image data step
510 Displaying image data step
202b', 202c', 202d', 202e' display

The invention claimed is:

1. An optical assembly for a camera system for a vehicle, comprising:
   at least one first lens configured to project at least one first field of view;
   at least one second lens configured to project at least one second field of view;
   at least one lens holder;
   at least one first lens tube configured to support the first lens; and
   at least one second lens tube configured to support the second lens,
   wherein at least one of:
      (i) at least one of the first lens or the second lens is connected at least partly to at least one of the first lens tube, the second lens tube, or the lens holder, or
      (ii) at least one of the first lens tube or the second lens tube is at least partly connected to the lens holder,
   wherein the first field of view is a close range field of view covering at least one area that comprises at least a part of the vehicle, that is at least partly adjacent to the optical assembly or the vehicle, and that is distanced from the optical assembly or the vehicle by a maximum of 0.2, 0.5, 1, 2, 3, 5 or 10 meters,
   wherein the first field of view comprises at least one area of a view area group comprising ECE R159 MOIS, ECE R151 BSIS, ECE R158, ECE R46, blind spot area according to ISO 17387, mirror class area I, mirror class area II, mirror class area IV, and/or mirror class area V and/or SVS area around the optical assembly, and wherein the first field of view is different from the second field of view and/or the first field of view comprises one of the areas of the view area group, whereas the second field of view comprises a different area of the view area group,
   wherein the second field of view is a far range field of view covering at least one area starting with a distance from the optical assembly or the vehicle of at least three meters, five meters, or seven meters, and
   wherein the second field of view covers at least one area that is distanced from the optical assembly or the vehicle by a maximum of 10, 20, 30, 50, 70, 100 or 300 meters.

2. The optical assembly of claim 1, wherein at least one of:
   the connections of the first and/or second lens to the first lens tube, the second lens tube and/or the lens holder, and/or of the first lens tube and/or the second lens tube to the lens holder comprises at least partly at least one UV adhesive;
   the first lens comprises at least one seat section, the second lens comprises at least one seat section, wherein the seat section is at least partly connected to the first lens tube, the second lens tube and/or the lens holder by the UV adhesive, and/or the first tube comprises at least one seat section and/or the second tube comprises at least one seat section, wherein the seat section is at least partly connected to the lens holder by the UV adhesive; or
   the use of UV adhesive enables, in an uncured state of the adhesive, a relative alignment between (i) the first lens and/or the second lens, and/or (ii) the first lens tube and/or the second lens tube.

3. The optical assembly of claim 1, wherein
   the first and second field of view overlap at least partly or do not overlap,
   the optical axis of the first lens is horizontal and/or parallel relative to a supporting ground of the vehicle, to a main plane of the optical assembly and/or the camera system,
   the optical axis of the second lens is tilted towards a horizontal plane of the optical assembly, being parallel to the supporting ground of the vehicle, a main plane of the optical assembly and/or the camera system, and/or is tilted towards an area of the close range field of view, wherein the first lens and the second lens are tilted towards the horizontal plane of the optical assembly with respective different angles to provide a least one backing-up view and/or comprising a first field of view covering a mirror class I area and/or a second filed of view covering an R158 area.

4. The optical assembly of claim 1,
   wherein the first and/or second lens are heatable by at least one heat provider,
   wherein the heat provider comprises at least one first heat element for the first lens and at least one second heat element for the second lens, and
   wherein at least one heat element is formed at least partly in a ring shape and/or surrounds at least partly the first and/or second lens.

5. The optical assembly of claim 1, wherein
   the first lens has a first aperture angle of 63.54°×44°, and/or
   the second lens (has a second aperture angle of 168°× 148°, or
   the second lens has a first aperture angle of 63.54°×44°, and/or
   the first lens has a second aperture angle of 168°×148°.

6. A camera system comprising an optical assembly according to claim 1.

7. The camera system according to claim 6, wherein the UV adhesive enables, in an uncured state of the adhesive, a relative alignment between the first and/or second lens, and/or first and/or second lens tube relative to the imager, before attaching the first and second lens and/or first and second lens tubes by curing the UV adhesive, the first lens and/or the second lens is adapted to project a field of view onto a common imager, and/or the imager provides at least one first area receiving at least partly the first field of view and at least one second area receiving at least partly the second field of view.

8. The camera system according to claim 6, wherein the lens plane of the first lens is substantially perpendicular to an optical axis of the imager, and/or the second field of view is projected onto the imager by at least one light guide element and/or light deflection element.

9. The camera system of claim 6, wherein the optical assembly is adapted to adjust the first and/or second field of view by moving the first lens and/or moving the second lens, wherein the movement of the first and/or second lens is provided by at least one hinge section, comprised by and or connected to the lens holder, the first lens, the second lens, the first lens tube, and/or the second lens tube; and/or a rotation of the lens holder, together with the imager and/or relative to a mounting position on the vehicle, the first and/or second lens tube, relative to each other and/or relative to the lens holder and/or relative to the mounting position on the vehicle, and/or the first and/or second lens, relative to the imager, wherein a movement of the first and/or second lens, relative to the first lens tube, the second lens tube and/or the lens holder, and/or a movement of a third and/or fourth lens enables a zooming in or zooming out effect and/or change of the depth of field.

10. The camera system of claim 6, wherein the camera system, comprises at least two optical assemblies, wherein the at least two optical assemblies interact, by aligning the optical assemblies, and/or at least a part of the image data of the at least one imager of the at least two optical assemblies are read out at least partly together, and/or the image data of the at least two optical assemblies are read out, transferred, displayed analyzed and/or processed at least partly together, and/or forms at least one rear view device.

11. A camera monitor system comprising at least one camera system according to claim 6; and at least one monitor and/or at least one electronic control unit.

12. A vehicle comprising at least one camera monitor system of claim 11, wherein at least two camera systems are mounted on opposite sides of the vehicle, and/or the camera system is adapted to capture at least partly ECE R159 MOIS, ECE R151 BSIS, ECE R158, ECE R46, blind spot area according to ISO 17387, mirror class area II, mirror class area IV, and/or mirror class area V and/or SVS area around the camera.

13. A method of aligning the optical assembly according to claim 1, comprising:

providing the at least one first lens and the at least one second lens;

providing the at least one first lens tube and the at least one second lens tube;

providing the at least one lens holder;

providing the at least one UV adhesive;

providing the at least one imager;

applying the UV adhesive to the seat section, of the first lens, the first lens tube, the second lens, the second lens tube, and/or the lens holder; and aligning the first and second lens, the first and second lens tube and/or lens holder relative to each other.

14. The method of claim 13, further comprising acquiring data provided by the imager, wherein the step of aligning comprises controlling and/or altering the data by the aligning.

15. The method according to claim 13, comprising the step of curing the UV adhesive after finalizing the step of aligning.

16. A method of analyzing and processing image data of at least one camera system according to claim 6, comprising the steps of defining, dynamically, at least one target viewing field of the camera system, wherein the target viewing field comprises at least partly the first and/or second field of view, and analyzing, altering and/or processing the data provided by the camera system based on the target viewing field.

17. The method according to claim 16, wherein the step of defining at least one target viewing field comprises adjusting and/or setting the target viewing field depending on sensor data, mounting position of the camera system, during mounting of the camera system to the vehicle, driver input data and/or software feedback.

18. The method according to claim 17, wherein the step of adjusting comprises a movement of the optical assembly, and/or adapting an readout area of the imager.

19. The method according to any one of the claim 16, wherein the processing of the data comprises defining, dynamically, at least one first readout area of the first area of the imager, defining, dynamically, at least one second readout area of the second area of the imager, processing the image data readout from the imager, reading out image data of the first and/or second readout area, transferring the image data of the first and/or second readout area to at least one electronic control unit, processing the image data of the first and/or second readout area preferably in the electronic control unit, and/or displaying at least partly the processed image data of the first and/or second readout area on at least one monitor, wherein the step of defining the first and/or second read out area is depending on sensor data, mounting position of the optical assembly and/or camera system, driver input data, software feedback, an area of view of class IV, a required frame rate of 50 fps or 30 fps, wherein the step of processing comprises mirror back the received image data of the read out mirrored image data of the first and/or second readout area, wherein the step of processing comprises in a first configuration using a first second field of view and second second field of view read out with a first frame rate from a first area of the sensor and comprises in a second configuration using a first second field of view and second second field of view read out with a second frame rate, and stitching to the second second field of view read out a read out of a further area of the sensor, optionally a wide field of view area, wherein the step of displaying comprises to display the wide field of view, with a first video effect, and/or wherein the at least partly displayed image data of the first and second readout areas are displayed individually or combined, wherein the combined display forms a substantially panoramic view of and/or around the vehicle.

20. The method of claim 16, wherein the method is adapted for use for predictive and/or resource saving driving, and/or the adjustment of the target viewing field leads to a substantially front view, side view, rear view, panoramic view, and/or combined view, preferably depending on the main driving direction of the vehicle, sensor data, state of the gearshift, a state of the gearbox, driver input, and/or a combination thereof, wherein the first lens and/or the second lens projects a close range in front or side of the vehicle, and/or the second lens and/or the first lens projects a far range in front and/or side and/or around the vehicle, wherein the method further comprises the steps of analyzing by means of software and/or at least one processor, comprising artificial intelligence and/or machine learning, the image data of the second readout area, of the far range, for at least one assistance system for predictive and/or resource saving driving, wherein the assistance system comprises in particular lane/sign recognition, brake assistant, autonomous driving and/or collision warning, and/or analyzing, by means of software and/or at least one processor, the image data of the first readout area of the close range for one or more assistance systems for outputting warning indications, such as visual indications of the area in front, side and/or back of the vehicle and/or approach assistant, wherein the step of processing for the second readout area is at least partly implemented by artificial intelligence and/or machine learning to enable and/or improve predictive driving, by detecting at least one object, vulnerable road user, and/or pattern especially of hazardous situations and/or behavior pattern of at least one road user, the behavior pattern preferably being a braking behavior, wherein the step of processing for the first readout area, of the close range, is at least partly implemented by artificial intelligence and/or machine learning to enable and/or improve predictive driving, by detecting at least one object, vulnerable road user, and/or road user and sending a warning and/or information to the driver by displaying the detected object, vulnerable road user, and/or road user as highlighted and/or by an optical and/or acoustical signal, detecting and/or locating at least one part of the vehicle and/or at least one appendage of a trailer and/or the end of the trailer, and sending a warning and/or information to the driver in particular by an optical and/or acoustical signal, a start-up assistant, that sends a warning to the driver and/or influences the driving behavior of the vehicle when detecting at least one vulnerably road user and/or a stop and/or go situation, wherein the processed and/or analyzed data of the first and/or second readout area is outputted at least partly as at least one CAN signal, and/or wherein the processed and/or analyzed data of the first and/or second readout area is used for the step of defining, adjusting and/or setting the target viewing field, in particular by means of artificial intelligence.

\* \* \* \* \*